Figure 1:
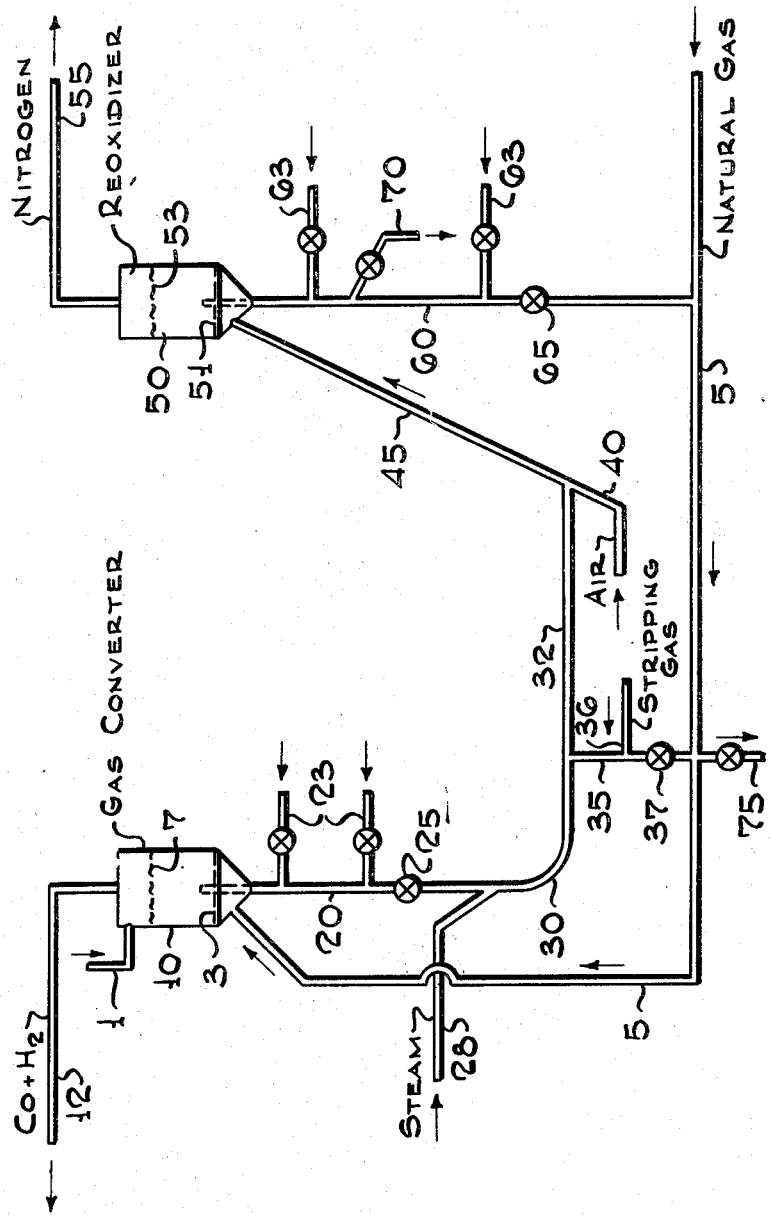

Patented May 1, 1951

2,550,742

UNITED STATES PATENT OFFICE 2,550,742

CONVERSION OF HYDROCARBON GASES TO HYDROGEN AND CARBON MONOXIDE

Albert B. Welty, Jr., Mountainside, N. J., assignor to Standard Oil Development Company, a corporation of Delaware Application June 28, 1946, Serial No. 679,886

5 Claims. (Cl. 48—196)

1

The present invention relates to the conversion of hydrocarbon gases. More specifically, the invention is concerned with the conversion of hydrocarbon gases such as natural gas, methane, ethane, or the like to form gas mixtures containing carbon monoxide and hydrogen, and particularly such gas mixtures as are useful as feed gas for the catalytic synthesis of hydrocarbons and/or oxygenated organic compounds.

It is well known in the art that gaseous hydrocarbons such as methane may be oxidized to form gas mixtures containing carbon monoxide and hydrogen. While air may be used as the oxidizing agent in this reaction the resulting dilution of the product gases with nitrogen has prompted various proposals and attempts to use pure oxygen or metallic oxides to supply the oxygen required for the oxidation of the hydrocarbon gas.

The use of pure oxygen requires expensive air fractionation equipment. When the oxidation is carried out by passing the hydrocarbon gases over suitable metal oxides, the extent of the reaction is difficult to control as a result of the excess of oxygen which is available for reacting with the incoming feed.

Some of these difficulties may be alleviated by reacting controlled amounts of finely divided metal oxides with a specific volume of gaseous hydrocarbons to be oxidized in a reaction zone at controlled reaction conditions. However, the formation of $CO_2$ and steam as oxidation products cannot be completely avoided and it has been found desirable to combine this oxidation process with a so-called "reformation" reaction wherein $CO_2$ and/or steam are reacted with unconverted or fresh hydrocarbon gas in the presence of a so-called reformer catalyst such as nickel, nickel supported on alumina or magnesia, or the like to form additional amounts of CO and $H_2$.

It is theoretically possible and has been suggested to carry out the oxidation and reformation reaction in a single reactor using the so-called fluid solids technique in which a mixture of finely divided metal oxide and reformer catalyst is admixed with the hydrocarbon gases to form a dense turbulent suspension resembling a boiling liquid with respect to hydrodynamic and hydrostatic properties. The metal oxide is reduced in the course of this reaction and must be reoxidized continuously or at intervals in order to maintain the desired oxygen concentration in the reactor. This reoxidation may be accomplished by withdrawing reduced metal oxide from

2 the reactor, reoxidizing it with air in a separate vessel and returning it to the reactor.

However, this procedure involves a similar treatment of the reformer catalyst which is intimately mixed with the metal oxide to be reoxidized, and I have found that the reformer catalyst loses in activity when subjected to oxidation in the metal reoxidation zone, which is difficult to avoid when fluidized mixtures of metal oxide and reformer catalyst are used in the process.

The present invention overcomes these difficulties and affords various additional advantages, as will appear from the following description thereof read with reference to the accompanying drawing which shows semi-diagrammatic views of apparatus adapted to carry out preferred embodiments of the invention.

It is therefore, a principal object of the present invention to provide an improved process for the conversion of gaseous hydrocarbons into gas mixtures containing carbon monoxide and hydrogen.

Another object of this invention is to provide an improved process for converting hydrocarbon gases into gas mixtures containing carbon monoxide and hydrogen by oxidation and reformation using the fluid solids technique.

A more specific object of the invention is to provide a process of the type specified which affords improved yields of a gas mixture suitable as a feed gas for the catalytic synthesis of hydrocarbons and/or oxygenated organic compounds.

A still further object of the invention is to provide an improved process of the type specified wherein oxidation and reformation may be conducted simultaneously in a single "fluid" conversion zone.

Other and further objects and advantages will appear hereinafter.

In accordance with the present invention substantially complete conversion of gaseous hydrocarbons such as methane, ethane, natural gas, or the like into mixtures of carbon monoxide and hydrogen suitable for the hydrocarbon synthesis, may be effected by contacting the gaseous starting material with a fluidized mixture of finely divided metal oxide and reformer catalyst, effecting a separation of reduced metal oxide from reformer catalyst, reoxidizing the reduced metal oxide with an oxidizing gas in the absence of a substantial proportion of the reformer catalyst, mixing the reoxidized metal oxide with the separated reformer catalyst and using this mixture for the conversion of further amounts of hydrocarbon gases into carbon monoxide and hydrogen.

Certain reformer catalysts particularly those supported by porous carriers such as nickel on magnesia alumina, kaoline, or the like, differ widely in density from the metal oxides such as oxides of iron, copper, etc. useful for the oxidation of hydrocarbon gases. For example reformer catalysts containing about 20–40% of nickel on alumina or magnesia usually have a true specific gravity of about 0.75–1 while that of iron oxides reduced in the gas conversion normally lies above 3.0 and frequently in the neighborhood of about 5.0. This difference has been found sufficient to make a separation by density feasible to a practical degree.

In accordance with the preferred embodiment of my invention, therefore, I withdraw a fluidized mixture of relatively heavy reduced metal oxide and relatively light reformer catalyst from the gas conversion zone, effect at least a crude separation of relatively heavy from relatively light solid particles, subject the relatively heavy particles to reoxidation and return both the unoxidized relatively light and the reoxidized relatively heavy particles to the fluidized mixture of solids in the conversion zone.

I have found that the centrifugal force developed by a relatively sudden change in the direction of flow of the fluidized mixture of solids flowing through any forced path at a relatively high velocity is sufficient to accomplish the desired degree of separation between reduced metal oxide and reformer catalyst of substantially lower specific gravity. A directional change of this type is my preferred means of causing the desired separation by density as will appear more clearly hereinafter.

Figure 2:
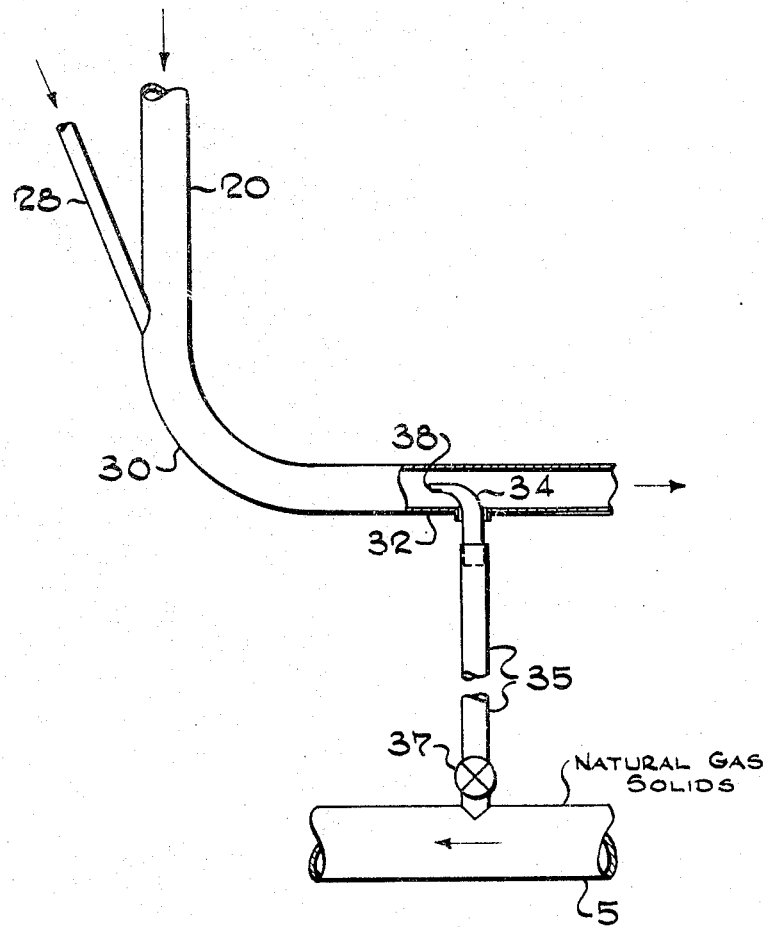

Having set forth its objects and general nature, the invention will be best understood from the more detailed description hereinafter, in which reference will be made to the accompanying drawing wherein Figure 1 is a diagrammatic view of a system suitable for carrying out the conversion of hydrocarbon gases in accordance with my invention; and Figure 2 illustrates diagrammatically my preferred means of separating reduced metal oxide from reformer catalyst.

Referring now in detail to Figure 1, the system illustrated essentially comprises a hydrocarbon gas converter 10 and a metal oxide reoxidizer 50, both adapted to fluid solids operation and cooperating as will be presently explained.

In operation, converter 10 which may be provided with a foraminous distribution plate such as a grid 3 is supplied through line 1 with a mixture of finely divided metal oxide and reformer catalyst. While certain oxides which are reduced to metals by the hydrocarbon gases, such as ferrous oxide, cuprous oxide, and the like, are useful for my process other suitable oxides are the higher oxides of metals which are capable of forming both higher and lower oxides, such as cupric oxide, vanadium pentoxide, ferric oxide, stannic oxide, and others. The reformer catalyst preferably comprises nickel as its active component supported on such carriers as alumina, magnesia, kaoline, etc. in concentration of about 20–40% by weight of total catalyst. The relative amounts of metal oxide and reformer catalyst may vary within wide limits depending on the specific materials used and the course of reaction desired. In general, good results are obtained with solids mixtures containing about 10–70%, preferably about 25–35% by weight of reformer carrier catalyst and about 30–90% preferably about 65–75% by weight of metal oxide such as ferric oxide or cupric oxide. The particle size of the solids should be within the fluidizable range of about 50–400 mesh preferably about 100–350 mesh. If desired, different particle sizes may be chosen for the metal oxide and the reformer catalyst in order to assist in the subsequent separation of these solids and/or to accomplish a rough classification within the fluidized beds of converter 10 and reoxidizer 50.

A hydrocarbon gas, such as natural gas, is supplied through line 5 and enters converter 10 through grid 3 at an upward flow velocity adequate to form above grid 3 a fluidized dense turbulent mass of solids having a well defined upper level 7 linear gas velocities of about 0.3–4, preferably 0.75–3 ft. per second, depending on the particle size of the solids, and space velocities of about 3–30 preferably about 5–10 cu. ft. of gas (measured at standard conditions) per lb. of solids in converter 10 per hour, are generally suitable for this purpose. The temperature within converter 10 is maintained within the approximate limits of 1400°–1800° F., preferably 1500°–1700° F., at which a substantial proportion of the methane of the natural gas is oxidized by the metal oxide to form $CO$, $CO_2$, $H_2$ and water, and $CO_2$ and water are reacted with unoxidized methane to form additional amounts of $CO$ and $H_2$. The net heat effect of this reaction is slightly endothermic and heat must be supplied to maintain the temperature at the desired level. This is preferably accomplished by supplying heat in the form of sensible heat of metal oxide returned from reoxidizer 50, as will appear more clearly hereinafter. The pressure within converter 10 may be subatmospheric, atmospheric, or superatmospheric, elevated pressures varying between about 75–400 lbs. per sq. in. being preferred for the production of feed gas for the hydrocarbon synthesis.

Product gas comprising carbon monoxide and hydrogen in the approximate ratio of 0.3–2 volumes of carbon monoxide per volume of hydrogen is taken overhead from converter 10 through line 12. If desired, the product gas may be freed of entrained solids fines by conventional mechanical and/or electrical gas-solids separation means (not shown) from which separated solids may be returned to converter 10 in a manner known per se.

A fluidized mixture of reduced metal oxide and reformer catalyst is withdrawn downwardly from converter 10 through a substantially vertical standpipe 20 provided with slide valve 25. The lower portion of standpipe 20 is curved at 30 and leads into a substantially horizontal pipe 32. The fluidized solids mixture which may be further aerated with a fluidizing gas supplied through taps 23, flows down standpipe 20 at a relatively high velocity controlled by slide valve 25. The velocity below slide valve 25 may be further increased by the injection into standpipe 20 of small amounts of steam or other inert gas supplied through line 28. Linear velocities of about 30 to 100 ft. per second in the lower portion of standpipe 20 are generally suitable for my process. The radius of curvature at the bend may be 5 to 30 ft. When the solids mixture enters the curved section 30 at the indicated velocities, it is subjected to an appreciable centrifugal force which causes the heavier particles to concentrate toward the outside of the curve and the lighter particles toward the inside of the curve. The mass leaves curve 30 crudely classified according to density, the bottom layer of the contents of pipe 32 being enriched in relatively heavy reduced metal oxide and the top layer in relatively light reformer catalyst. Depending on the velocity of the solids this separation may be such as to increase the concentration of reformer catalyst in the uppermost stream from say 30% to 75-80%, a concentration of 50% being normally adequate to maintain the activity of the reformer catalyst to the desired degree.

At least a substantial portion of the top layer is removed from pipe 32 by any suitable means and returned through standpipe 35 provided with control valve 37 to gas feed line 5 and from there to converter 10. If desired, an aerating or stripping gas such as nitrogen-rich gas from the reoxidizer may be supplied to standpipe 35 through line 36. Preferred means for accomplishing the removal of relatively light materials from pipe 32 will be more fully described below in connection with Figure 2 of the drawing.

The lower layer of the contents of pipe 32 which is enriched in reduced metal oxide is passed on through pipe 32, picked up by an oxidizing gas such as air, oxygen, or air enriched with oxygen, supplied through line 40, and passed in the form of a relatively dilute suspension through pipe 45 of preferably enlarged cross-section, into the bottom portion of reoxidizer 50 which may be of a construction similar to that of converter 10. The suspension of solids in oxidizing gas enters reoxidizer 50 through grid 51 to form thereabove a dense turbulent fluidized mass of solids having a well defined upper level 53. The conditions of superficial gas velocity and gas throughout are about the same as those specified in connection with converter 10. However, sufficient oxygen must be supplied to accomplish the desired reoxidation of the reduced metal oxide, which normally requires about 0.001 to 0.01 lb. of oxygen per lb. of solids supplied to reoxidizer 50. In order to balance the heat produced in the reoxidizer with the heat absorbed in the converter, solids must be circulated much faster (possibly 50 times as fast) as would be necessary based on oxygen transfer requirements alone.

The oxidation reaction in reoxidizer 50 is strongly exothermic and the temperature of the solids undergoing reoxidation may be readily maintained at a slightly higher level than the conversion temperature in converter 10, say at about 1500–1900° F., preferably 1600–1800° F., by a proper control of the oxygen supply or by conventional heat transfer means (not shown). Slightly elevated pressures are favorable for the reoxidation reaction. The reoxidation may be run at a somewhat lower pressure than the gas converter by placing the reoxidizer at a high level and having a long standpipe beneath it and above the slide valve which controls the flow of solids from the reoxidizer.

Residual oxidizing gas, usually consisting of technically pure nitrogen is withdrawn overhead from reoxidizer 50 through line 55 to be vented or used for any suitable purpose such as for stripping and purging gas, if desired, after the separation and return of entrained solids by conventional means (not shown). Fluidized reoxidized metal oxide containing minor amounts of reformer catalyst is withdrawn downwardly from reoxidizer 50 through standpipe 60 provided with control valve 65 and aerated with small amounts of a fluidizing gas supplied through taps 63. Standpipe 60 leads into gas feed pipe 5 wherein the solids are picked up by the hydrocarbon gas feed and returned, together with the solids coming from pipe 35 to converter 10 substantially at the temperature of reoxidizer 50 to supply the heat required for the endothermic reaction in converter 10. Solids of undesirably small particle size and/or spent reformer catalyst may be removed from the system through lines 70 and 75 and replaced by fresh material added through line 1.

It will be understood that my process may be made fully continuous by maintaining a continuous gas feed and withdrawal through pipes 5, 40, 12, and 55 and a continuous circulation of solids through pipes 5, 32, and 35. The relative amounts of solids withdrawn from and returned to converter 10 should be sufficient to maintain the desired reaction temperature in converter 10. In general, a circulation of 5 to 25 lbs. of metal oxide per cu. ft. of hydrocarbon gas to be converted is adequate for this purpose.

Referring now to Figure 2, I have shown therein in greater and enlarged detail preferred means of separating the crudely classified solids in pipe 32 of Figure 1, like reference symbols being used for like parts appearing in both Figures 1 and 2.

The fluidized solids mixture flowing down through standpipe 20 at a velocity of about ½ to 10 ft. per second which may be increased by steam added through line 28 to about 30 to 100 ft. per second is classified by centrifugal force while passing through curved section 30 in such a manner that the concentration of relatively heavy particles increases from the top to the bottom of the solids mixture flowing through pipe 32. Standpipe 35 is provided at its upper end with a solids pick-up device 34 which is adjustable in height and penetrates pipe 32 to any desired level. Pick-up device 34 has a preferably elongated horizontal orifice 38 whose length may be about ¼ to ¾ and whose height about $\frac{1}{16}$ to ¼, of the diameter of pipe 32. By raising or lowering pick-up device 34 it is possible to remove from pipe 32 fractions of any desired ratio of relatively heavy reduced metal oxide to relatively light reformer catalyst within the limits determined by the concentration gradient across the height of pipe 32. The solids picked up by pick-up device 34 are passed through standpipe 35 and gas feed pipe 5 to converter 10, as described above. Solids by-passing pick-up device 34 flow through pipe 32 to enter reoxidizer 50 in the manner explained in connection with Figure 1.

I have shown a vertical flow of the solids mixture through pipe 20 and curved section 30 and this is the preferred manner of carrying out the invention because the gravitational force may be utilized to increase the flow velocity and the separating effect of the directional change. However, similar effects may be accomplished with a horizontal or inclined direction of flow, provided sufficiently high flow velocities and sharp directional changes are chosen. My invention is not limited to a situation wherein the reformer catalyst is specifically lighter than the metal oxide, but it may be readily adapted to a reversed situation, for example wherein the metal oxide is supported on a specifically lighter carrier material such as magnesia or alumina and the reformer catalyst is unsupported. In such a case pipe 35 may be connected to line 45 and pipe 32 to line 5, as will be understood by those skilled in the art.

My invention will be further illustrated by the following specific example.

*Example*

A plant to produce 300,000 s. c. f./hr. of synthesis gas containing 1.9 parts per volume of $H_2$ per 1 part of CO may be operated at the conditions given below:

Natural Gas Feed, 100,000 S. C. F./Hr.
Air Feed, 260,000 S. C. F./Hr.
Solids Circulation Rate Between Vessels 10 and 50, 750 Tons/Hr.
Throughput of Gas Converter, 200 V./V./Hr.
Superficial Gas Velocity in Vessels 10 and 50, 1.0–2.0/Sec.
Catalyst Life, 3 Months.
Radius of Curvature of Separation Pipe, 20 ft.
Solids Flow Speed in Curve of Separation Pipe, 60 ft./sec.

| Solids Composition | Gas Converter Per Cent By Weight | Reoxidizer Per Cent By Weight |
|---|---|---|
| Reformer Catalyst (Ni on MgO) | 25–35 | 10–15 |
| Reducible Metal Oxide (Iron Oxide or Copper Oxide) | 65–75 | 85–90 |

Density of Reformer Catalyst, 0.75–1.0 (unfluidized).
Density of Reducible Oxide, 2.5–4.0 (unfluidized).
Particle Sizes, about 50% through 325 mesh and all finer than 100 mesh.

Reference is made to my copending application Serial Number 679,885, filed June 28, 1946, now abandoned, for improvement in "Solids Separation," wherein means for separating finely divided solids of different specific gravity, applicable in my present invention, are disclosed and claimed more broadly.

While the foregoing description and exemplary operations have served to illustrate specific applications and results of the invention, other modifications obvious to those skilled in the art are within the scope of the invention. Only such limitations should be imposed on the invention as are indicated in the appended claims.

I claim:

1. The method of converting normally gaseous hydrocarbons by oxidation and reformation into gas mixtures containing carbon monoxide and hydrogen which comprises maintaining in a conversion zone a mixture of finely divided metal oxide and metallic nickel-containing reformer catalyst having a particle weight different from that of said metal oxide, said mixture being fluidized by a gas to form a dense turbulent solids phase resembling a boiling liquid, contacting a normally gaseous hydrocarbon at conversion conditions with said solids phase, withdrawing a portion of said mixture from said conversion zone, passing said portion through a confined path involving a directional change at a velocity sufficiently high to create an appreciable centrifugal force at the point of directional change, the direction of said path directly preceding said directional change being substantially vertically downward and the direction of said path directly subsequent to said directional change being substantially horizontal, separating a fraction relatively enriched in metal oxide from a fraction relatively enriched in reformer catalyst at a point on said path subsequent to said directional change, subjecting said first named fraction to oxidizing conditions in an oxidizing zone, and returning said second named fraction and said first named oxidized fraction to said conversion zone.

2. The method of claim 1 wherein said metal oxide is present in a form having a particle weight less than that of said reformer catalyst.

3. The method of claim 1 wherein said reformer catalyst is present in a form having a particle weight less than that of said metal oxide.

4. The method of claim 3 wherein said reformer catalyst comprises nickel supported on a carrier having a density less than that of said nickel.

5. The method of converting normally gaseous hydrocarbons by oxidation and reformation into gas mixtures containing carbon monoxide and hydrogen which comprises maintaining in a conversion zone a mixture of finely divided metal oxide and nickel-containing reformer catalyst having a particle weight different from that of said metal oxide, said mixture being fluidized by a gas to form a dense turbulent solids phase resembling a boiling liquid, contacting a normally gaseous hydrocarbon at conversion conditions with said solids phase, withdrawing a portion of said mixture downwardly from said conversion zone, passing said mixture as a dense aerated mass of solids in substantially vertical downward flow through a confined path of sufficient length to build up a substantial pseudo-hydrostatic pressure on the base of said path, suddenly changing the direction of solids flow adjacent to said base to become substantially non-vertical in a continuation of said path at a velocity sufficiently high to create an appreciable centrifugal force at the direction of said change, separating a fraction relatively enriched in metal oxide from a fraction relatively enriched in reformer catalyst at a point within said continuation, subjecting said first named fraction to oxidizing conditions in an oxidizing zone, and returning said second named fraction and said oxidized first named fraction to said conversion zone.

ALBERT B. WELTY, Jr.

REFERENCES CITED

The following references are of record in the file of this patent:

UNITED STATES PATENTS

| Number | Name | Date |
|---|---|---|
| 2,022,778 | Maier | Dec. 3, 1935 |
| 2,039,603 | Maier | May 5, 1936 |
| 2,044,915 | Mosley | June 23, 1936 |
| 2,398,954 | Odell | Apr. 23, 1946 |
| 2,425,754 | Murphree et al. | Aug. 19, 1947 |
| 2,443,673 | Atwell | June 22, 1948 |
| 2,462,891 | Noll | Mar. 1, 1949 |